US006721679B2

(12) United States Patent
Aoyama

(10) Patent No.: US 6,721,679 B2
(45) Date of Patent: Apr. 13, 2004

(54) DISTANCE MEASURING APPARATUS AND DISTANCE MEASURING METHOD

(75) Inventor: Chiaki Aoyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 130 days.

(21) Appl. No.: 09/984,040

(22) Filed: Oct. 26, 2001

(65) Prior Publication Data

US 2002/0052711 A1 May 2, 2002

(30) Foreign Application Priority Data

Oct. 27, 2000 (JP) ........................................ 2000-328284

(51) Int. Cl.[7] ........................ G01B 11/02; G01B 11/14; G01B 13/02; G01B 21/02
(52) U.S. Cl. ........................................ 702/158; 702/159
(58) Field of Search ................. 356/3, 4.01; 702/158, 702/159; 354/3

(56) References Cited

U.S. PATENT DOCUMENTS

| 4,937,445 | A |   | 6/1990  | Leong et al.     |          |
|-----------|---|---|---------|------------------|----------|
| 4,954,962 | A | * | 9/1990  | Evans, Jr. et al.| 364/513  |
| 5,329,467 | A | * | 7/1994  | Nagamune et al.  | 702/159  |
| 5,812,269 | A |   | 9/1998  | Svetkoff et al.  |          |
| 6,028,672 | A |   | 2/2000  | Geng             |          |
| 6,094,270 | A | * | 7/2000  | Uomori et al.    | 356/623  |
| 6,204,916 | B1| * | 3/2001  | Norita et al.    | 356/141.1|
| 6,268,918 | B1| * | 7/2001  | Tanabe et al.    | 356/376  |
| 6,317,652 | B1| * | 11/2001 | Osada            | 700/245  |
| 6,421,114 | B1| * | 7/2002  | Miyazaki et al.  | 356/3.01 |
| 6,441,888 | B1| * | 8/2002  | Azuma et al.     | 356/4.01 |

FOREIGN PATENT DOCUMENTS

| EP | 0 510 613 A1 | 10/1992 |
| JP | A5-119154    | 5/1993  |
| JP | A7-174537    | 7/1995  |
| JP | A10-48336    | 2/1998  |
| JP | A11-142122   | 5/1999  |
| JP | A2000-186920 | 7/2000  |
| JP | A2001-108420 | 4/2001  |

OTHER PUBLICATIONS

Hattori, K; Sato, Y;"Handy Rangefinder for Active Robot Vision"; Proceedings IEEE Int'l Conference On Robotics And Automation; 1995, vol. 2; pp 1423–1428.*
Yuta, S; Suzuli, S; Saito, Y; Iida, S;"Implementation of an Active Optical Range Sensor Using Laser Slit for In–Door Intelligent Mobile Robot";Proceedings IEEE/RSJ Int'l Workshop On Intelligent Robots and Systems; Nov. 1991; vol. 1; pp 415–420.*
Ohya, A; Shoji, E; Yuta, S;"3–D Range Sensor Using Fiber Grating for Recognition of Autonomous Mobile Robot's Passage Space"; Proceedings IEEE/RSJ Int'l Conference On Intelligent Robots and Systems; Sep. 1991; vol. 3; pp 1759–1763.*

* cited by examiner

*Primary Examiner*—John Barlow
*Assistant Examiner*—Douglas N Washburn
(74) *Attorney, Agent, or Firm*—Birch, Stewart, Kolasch & Birch, LLP

(57) ABSTRACT

A distance measuring apparatus is provided which utilizes a light-section method capable of measuring both close objects and far away objects without adjusting the dynamic range of an imaging camera. The apparatus comprises: an image acquisition section for imaging reflected light which has been emitted from the apparatus, has passed through a slit, and has then been reflected off the surface of a target object; an emission control section for controlling the emission time of the slit light during the time an image is being scanned by the image acquisition section, and for changing the intensity of the received light in the image acquisition section; and a distance calculation section for calculating the distance to the object based on the image taken by the image acquisition section and a positional relationship between a light emission position of the slit light and an image position.

12 Claims, 6 Drawing Sheets

DISTANCE MEASURING APPARATUS AND DISTANCE MEASURING METHOD

BACKGROUND OF THE INVENTION

1. Field of the Invention

The present invention relates to a distance measuring apparatus and to a method for measuring the distance from the apparatus to an object by imaging light which has been emitted from the apparatus, passed through a slit and been reflected off the object, and then referring to a positional relationship between the light emission position and the image position.

2. Description of the Related Art

Recently, CCD (Charged Coupled Device) cameras and computer image processing techniques have been improved, and accordingly, three-dimensional measurement methods using images have become common. An example of such three-dimensional measurement methods using a CCD camera and computer image processing is a light-section method. In the light-section method, light passing through a slit is projected onto a target object to be measured, so as to virtually cut the object using a band-shaped light, and a cut surface is observed in a direction other than the direction of the projected light. Because very fine and intense light beams can be obtained by laser technology, even an object having an irregular surface can be measured at high speed and with high accuracy by employing three-dimensional measurement using the light-section method.

Generally, in the light-section method, the distance to the target object is determined using the principle of triangulation. In triangulation, a triangle is defined by connecting two known reference points and any other third point, and the position of the third point is determined by measuring the angles of the triangle. More specifically, in the light-section method, light which is emitted from a light source within a distance measuring apparatus and passes through a slit is projected onto an object, and the reflected light from the surface of the object is imaged by a CCD camera provided within the distance measuring apparatus. The distance between the distance measuring apparatus and the target object is measured based on the direction of the emitted light and the positions of the light source and the CCD camera. Therefore, it is preferable that the intensity of the reflected light imaged by the CCD camera is constant.

However, even if the intensity of the light which is emitted from the distance measuring apparatus and passes through a slit is constant, the intensity of the reflected light varies according to the distance to the object and the reflective properties of the surface of the object. The measurement principles of the light-section method require that an image of the light which passes through a slit (also referred to hereunder as slit light) be taken continuously by the CCD camera. Conventionally, in three-dimensional measurement using the light-section method, because the approximate distance to the object and the state of the surface of the object to be measured are known to some extent, measurement is generally performed after the intensity of the slit light, and the dynamic range of the CCD camera have been adjusted during a calibration time prior to the measurement.

However, when a floor surface or an obstacle on a floor surface is detected using the light-section method in a visual sensor of a self-controlled robot, because the distance to the object to be measured and the reflective properties of the surface of the object are unknown, the intensity of the slit light and the dynamic range of the CCD camera cannot realistically be pre-adjusted. Consequently, measurements must be performed using an apparatus having a dynamic range which covers the range of light from weak light to strong light, using laser light having a predetermined intensity. However, depending on the distance to the object or the reflective properties of the object, a problem can occur when the light is not within the dynamic range of the CCD camera. In particular, because the light-section method recognizes the shape of the object and measures the distance to the object according to the state of the image taken of the slit light, when imaging cannot be performed for the slit light, it is not possible to ascertain whether imaging is impossible because of the influence of the dynamic range, or because the light is lost in the shadows of the object, and as a result distance measurement and recognition of the object cannot be performed accurately. Furthermore, another problem is that strong light passed through the slit is imaged as thick light, and so it is difficult to obtain an accurate position for the object.

SUMMARY OF THE INVENTION

In consideration of the above circumstances, an object of the present invention is to provide a distance measuring apparatus and a distance measuring method utilizing a light-section method capable of measuring both close objects and far away objects without adjusting the dynamic range of the imaging camera.

A distance measuring apparatus according to the present invention comprises: an image acquisition section for imaging reflected light which has been emitted from the apparatus, has passed through a slit, and has then been reflected off the surface of a target object to be measured; an emission control section for controlling the emission time of the light which is emitted and passes through the slit during the time an image is being scanned by the image acquisition section, and for changing the intensity of the received light in the image acquisition section; and a distance calculation section for calculating the distance to the object based on the image taken by the image acquisition section by referring to a positional relationship between a light emission position of the light passing through the slit and an image position.

In a distance measuring method according to the present invention, light which has passed through a slit is emitted onto a target object to be measured, and light reflected by the object is imaged by an imaging section, and based on the obtained image, the distance to the object is measured by referring to a positional relationship between a light emission position of the light which has passed through the slit and an image position, and moreover when the light passed through the slit is projected onto the object, an emission time of the light passed through the slit is varied within a time period during which the imaging section scans the image.

According to the present invention, in a case where light which has been emitted from an apparatus, passed through a slit, and reflected off an object is imaged, and the distance to the object is then measured by referring to a positional relationship between the light emission position of the slit light and the image position, then because measurement is performed by, for example, diffusing laser light emitted by the apparatus in one direction and creating slit light and projecting this slit light onto the object to be measured, and then changing the emission time of the slit light within the scanning time of the image acquisition section, the brightness distribution of the imaged slit light becomes uniform, and imaging of the slit light can be performed with certainty.

As a result, the distance accuracy can be improved, and the distance measurement processing can be simplified. In this way, regarding a problem in that when an obstacle is detected using the light-section method in a visual sensor of a self-controlled robot, recognition of an object and distance measurement cannot be performed accurately, the present invention can ensure that the brightness distribution of slit light becomes uniform, thereby improving the accuracy for recognition of an object and distance measurement.

In the distance measuring apparatus, the emission control section may also be constructed so as to determine the emission time according to the intensity of the reflected light received by the image acquisition section. In the same manner, in the distance measuring method, the intensity of the emitted light which passes through the slit may be changed in accordance with the intensity of the imaged light reflected off the surface of the object.

Consequently, the brightness distribution of the reflected light can be reliably converted to a uniform level, even for unknown objects.

DETAILED DESCRIPTION OF THE PREFERRED EMBODIMENTS

As follows is a description of a distance measuring apparatus according to an embodiment of the present invention, with reference to the drawings.

Figure 3:
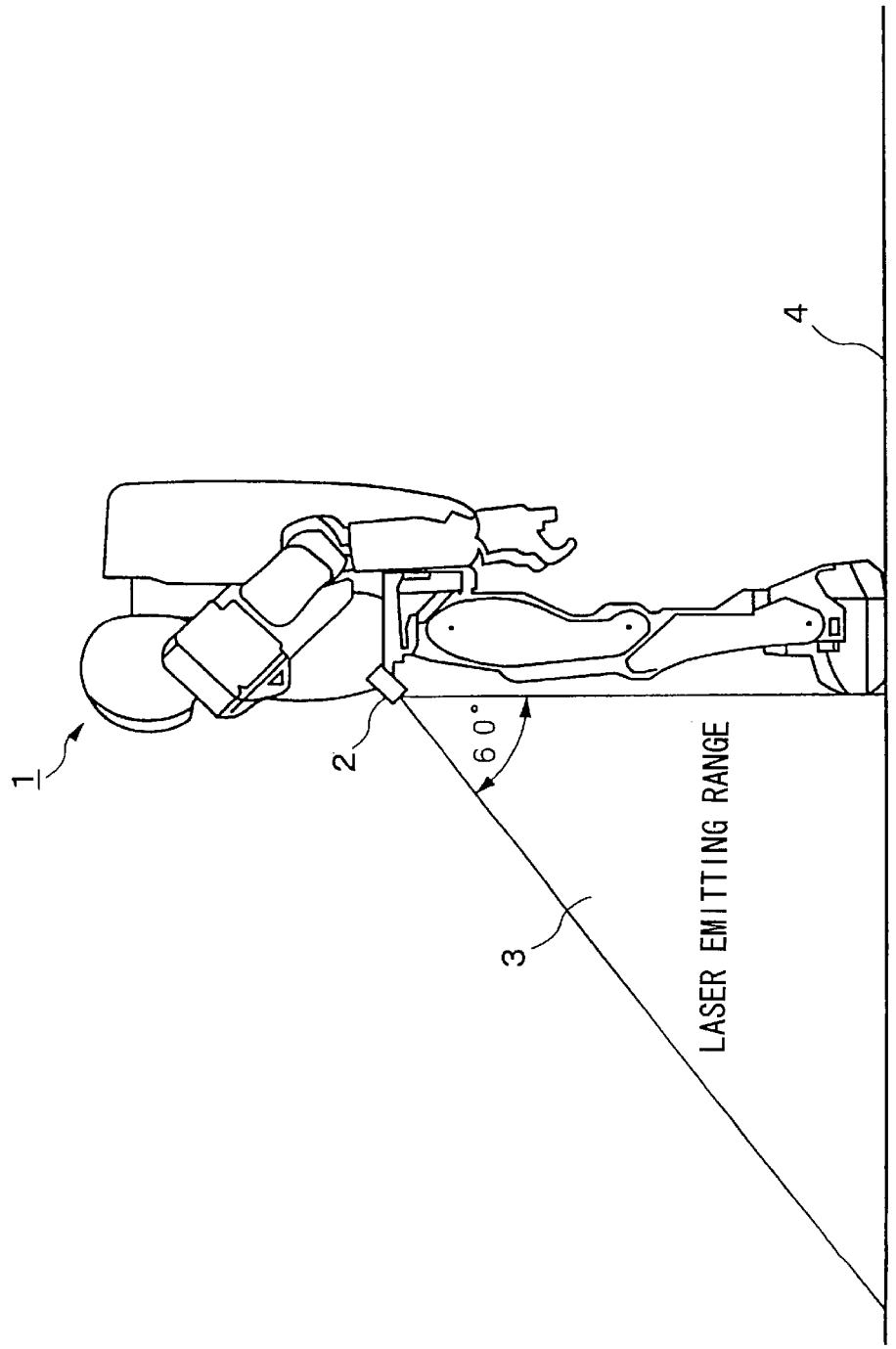
FIG. 3 is a diagram showing the external appearance of a bipedal robot 1.

First, with reference to FIG. 3, a bipedal robot to which a distance measuring apparatus is attached will be described. In FIG. 3, reference numeral 1 indicates a self-controlled bipedal robot (hereinafter abbreviated to 'robot'). Reference numeral 2 indicates an optical system of the distance measuring apparatus which is attached to the robot 1 at waist level. Reference numeral 3 indicates a laser light emission range of the optical system 2, where the laser light is spread over 60 degrees in a single plane so as to create slit light, with this slit light being projected towards a floor surface 4. In addition, the orientation of the optical system 2 is adjusted so that the slit light is projected onto the floor surface in front of the tip of a foot of the robot 1.

Figure 1:
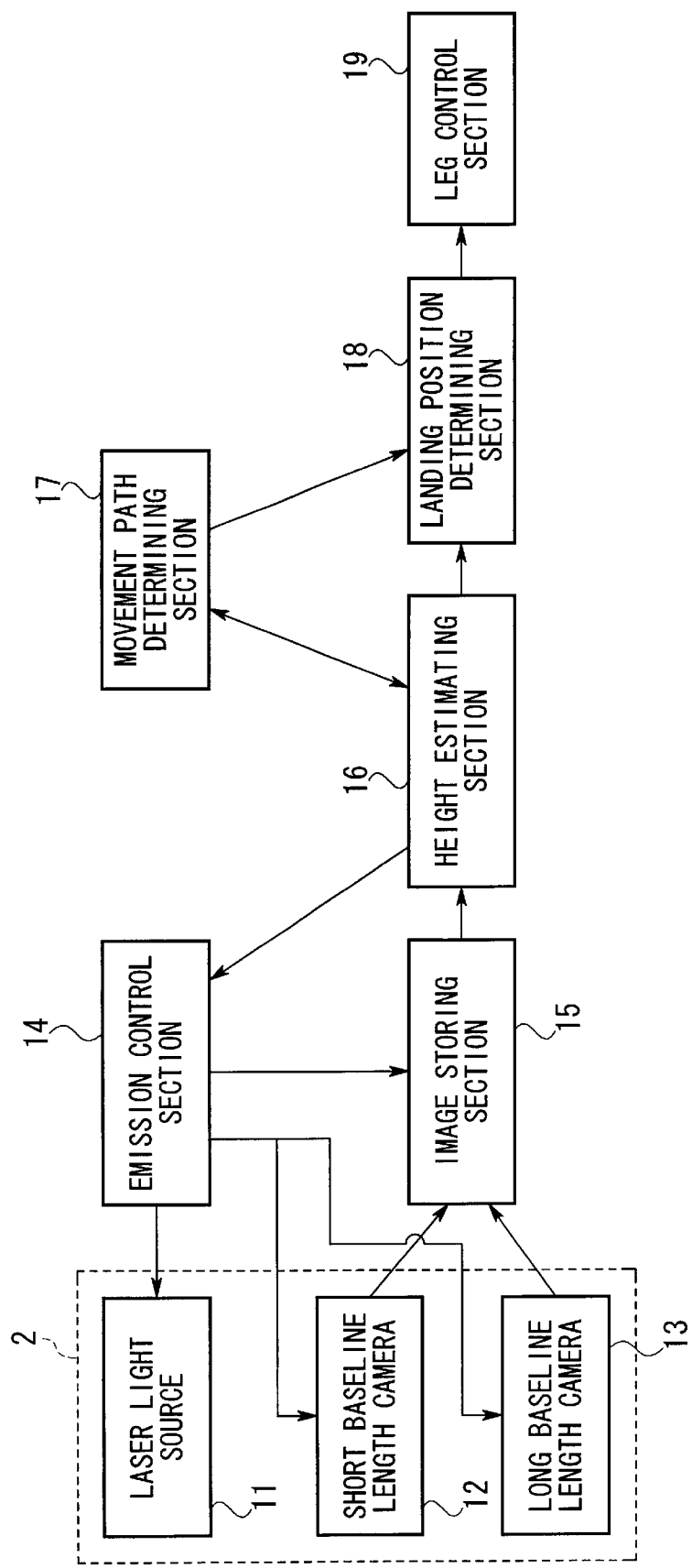
FIG. 1 is a block diagram showing the structure of a distance measuring apparatus according to an embodiment of the present invention.

FIG. 1 is a block diagram showing the structure of the distance measuring apparatus according to the present embodiment. In this figure, reference numeral 11 indicates a laser light source for emitting laser light towards the target object to be measured. Reference numeral 12 indicates a short baseline length camera arranged close to the laser light source 11, and comprises an interlaced scanning CCD camera. Because the short baseline length camera 12 has a short baseline length the accuracy for measuring distance is poor, although a large distance range in front of the robot 1 can be observed with this camera 12. Reference numeral 13 indicates a long baseline length camera arranged away from the laser light source 11, and also comprises an interlaced scanning CCD camera. Because this long baseline length camera 13 has a long baseline length the associated accuracy for measuring distance is high, although the distance range in front of the robot 1 is limited. Furthermore, the short baseline length camera 12 and the long length baseline camera 13 can be operated using a synchronizing signal input from an external device.

Reference numeral 2 indicates the optical system shown in FIG. 3, and incorporates the laser light source 11, the short baseline length camera 12 and the long baseline length camera 13. Reference numeral 14 indicates an emission control section for controlling the laser light source 11 by outputting a control signal which controls the emission of the laser light to the laser light source 11, and is provided with a Pulse Width Modulator (hereafter referred to as a 'PWM') for outputting a vertical synchronizing signal to the short baseline length camera 12 and the long baseline length camera 13, as well as generating a pulse in synchronization with this vertical synchronizing signal. Reference numeral 15 indicates an image storing section having four image memories for storing the image signals output from the two cameras. The image storing section 15 stores each field image of the two interlaced cameras in the four respective image memories.

Reference numeral 16 indicates a height estimating section for estimating the height of an object ahead by referring to the distance to the object determined based on the image data stored in the image storing section 15. Reference numeral 17 indicates a movement path determining section for determining the path of movement of the robot 1 in accordance with the state of the target object as estimated by the height estimating section 16. Reference numeral 18 indicates a landing position determining section for determining the landing position of the legs of the robot 1 based on the path chosen by the movement path determining section 17 and the height of the object estimated by the height estimating section 16. Reference numeral 19 indicates a leg control section for controlling the legs so as to land the foot on the landing position determined by the landing position determining section 18.

Figure 2:
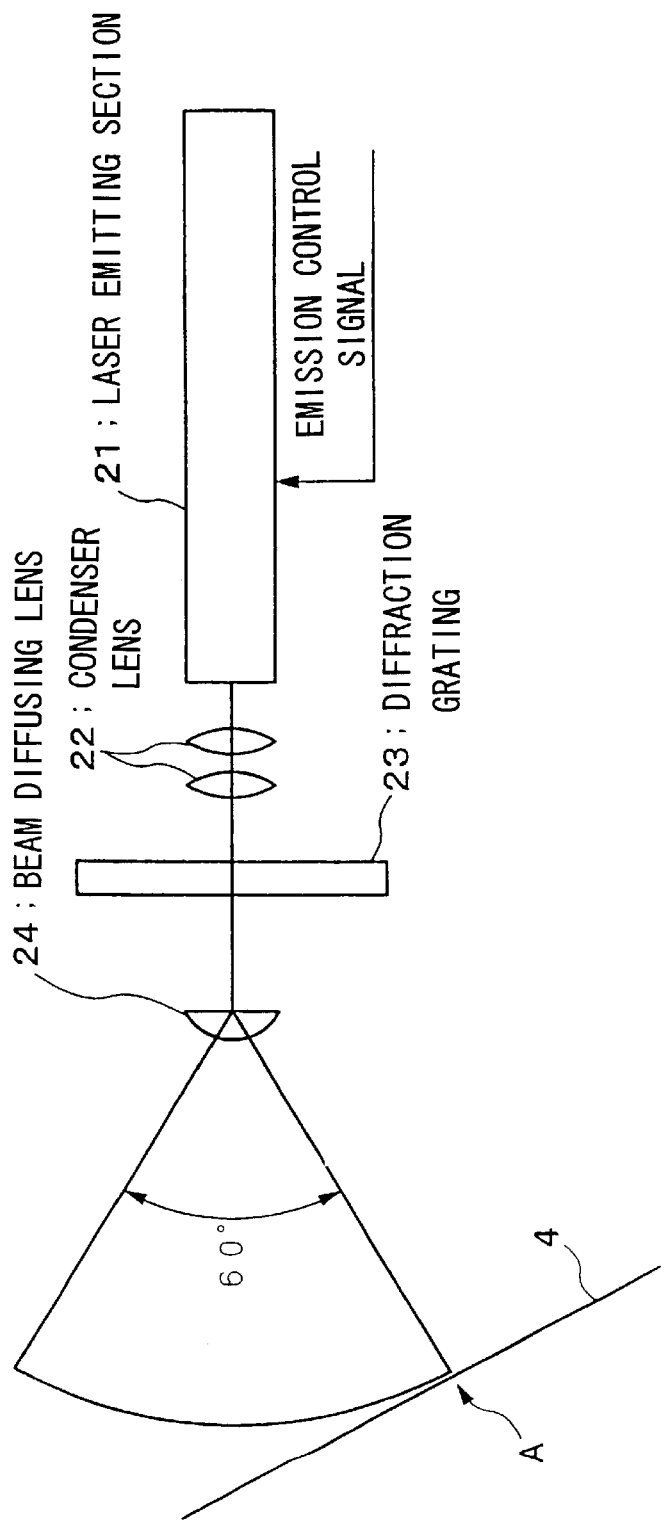
FIG. 2 is a block diagram showing the structure of a laser light source 11 shown in FIG. 1.

Next, the structure of the laser light source 11 shown in FIG. 1 will be described in detail with reference to FIG. 2. FIG. 2 is a block diagram showing the structure of the laser light source 11 shown in FIG. 1. In the figure, reference numeral 21 indicates a laser emitting section for emitting laser light. Reference numeral 22 indicates a condenser lens for condensing the laser light emitted from the laser emitting section 21, so as to obtain a narrow, condensed beam. Reference numeral 23 indicates a diffraction grating for dividing the laser beam condensed through the condenser lens 22 into a plurality of beams. Here, the divided beams are aligned in the direction perpendicular to the plane of FIG. 2. Reference numeral 24 indicates a beam diffusing lens using a cylindrical lens or the like. This beam diffusing lens is provided for diffusing each laser beam in a single plane so as to generate a beam having a beam form obtained by passing through a slit. Each of the plurality of beams is diffused by the beam diffusing lens 24 so as to have a diffusion angle of 60 degrees.

Figure 5:
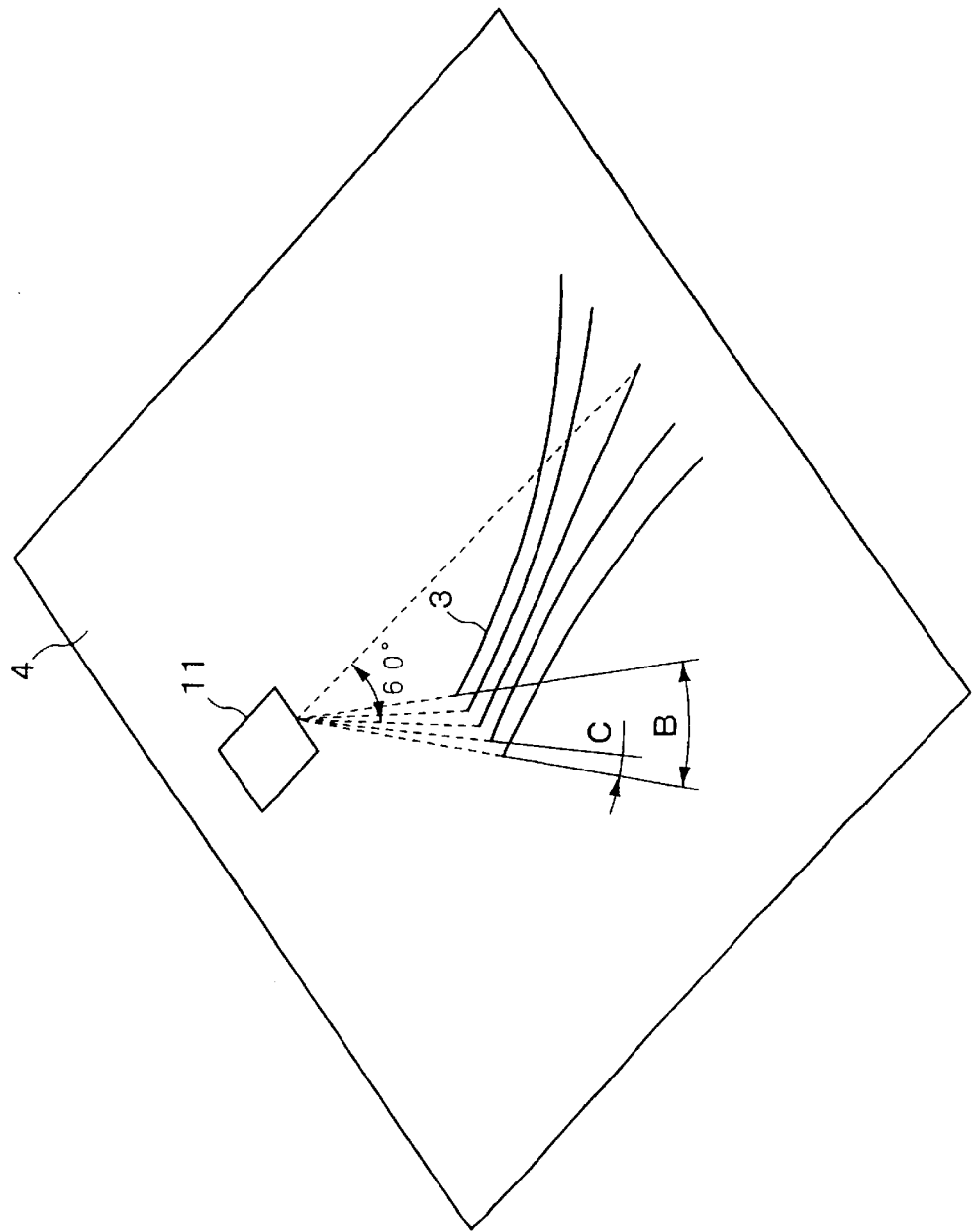
FIG. 5 is a schematic diagram showing a state in which laser light is emitted from an optical system 2.

Moreover, in FIG. 2, in order to show the positional relationship of the floor surface, reference numeral 4 indicates a line representing the floor surface, and reference symbol A indicates the point where the tip of the foot of the robot 1 is positioned. Furthermore, the schematic diagram of FIG. 5 shows a state in which the laser light is emitted from the optical system 2 which is attached to the robot 1 at waist level. In FIG. 5, reference numeral 11 indicates the laser light source. Reference numeral 3 indicates the laser emission range of laser light from the laser light source emitted onto the floor surface 4. Here, the laser light is divided into five beams by the diffraction grating 23, and the five beams are diffused by 60 degrees through the beam diffusing lens 24. These laser beams are projected towards the floor surface 4, and images of the light reflected by the floor surface are taken by the short baseline length camera 12 and the long baseline length camera 13. In FIG. 5, in order to make the figure easy to understand, the diffraction grating 23 divides the laser light into five beams, but in practice, angle B in FIG. 5 is 32 degrees and angle C is 1.6 degrees. Accordingly, the number of beams will be twenty one.

Figure 6:
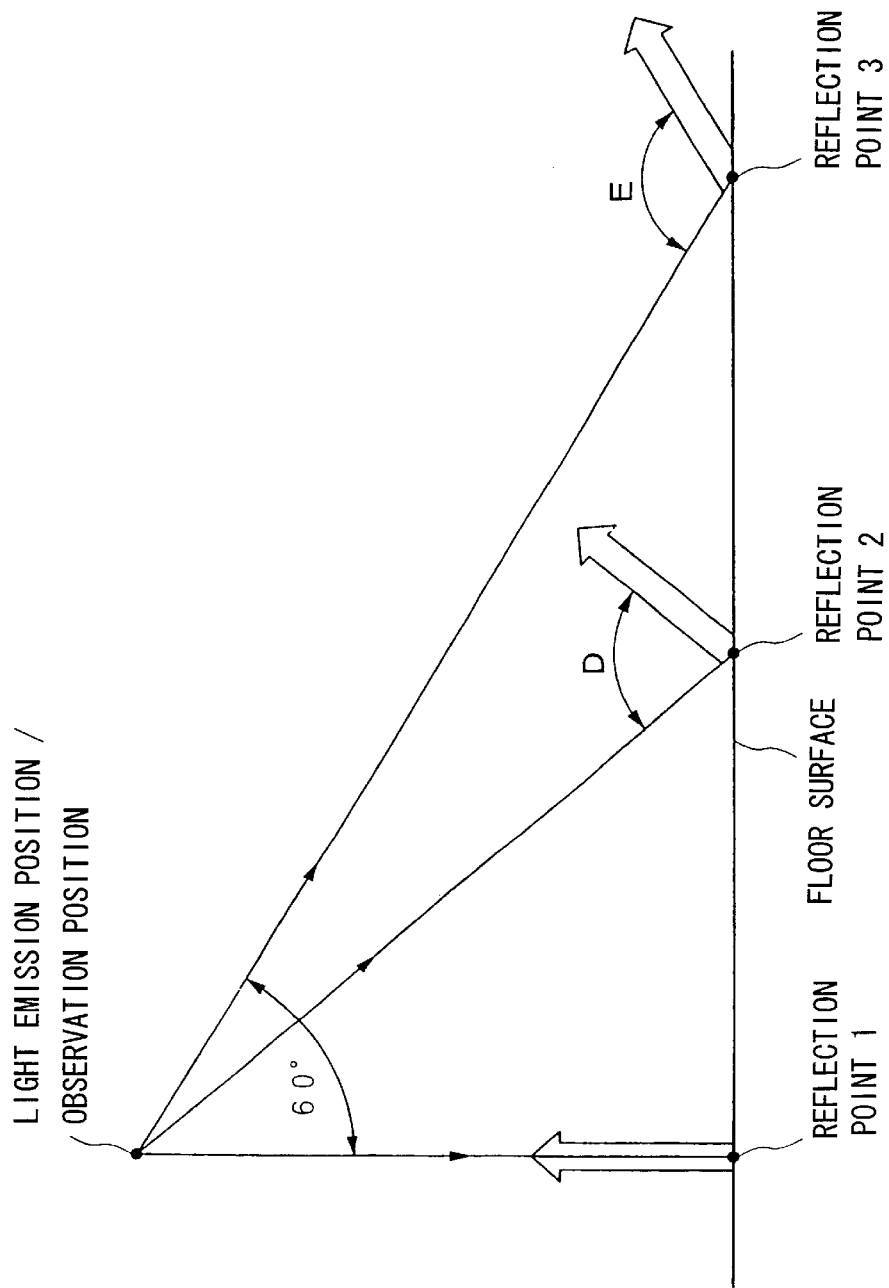
FIG. 6 is a diagram showing reflective properties of a floor 4.

Next, the reflective properties of a typical floor surface will be described with reference to FIG. 6. FIG. 6 is a diagram showing the reflective properties of the floor surface. The reflective properties of a typical surface are such that, if the surface does not have perfect diffuse reflection characteristics, the intensity of the specular reflected element is strongest, even if the surface is not a mirror surface. In the optical system 2 which is attached to the robot 1 at waist level, the light emission position and the observation position are at approximately the same location. Consequently, when light reflected from a reflection position 1 is received at the observation position, this amounts to the reception of a specular reflection. On the other hand, the specular reflection element reflected from a reflection position 2 does not return to the observation position, and in the same manner, the specular reflection element reflected from a reflection position 3 does not return to the observation position. In addition, the angles D and E, formed between the reflection direction and the observation position direction of the specular reflection element at the reflection positions 2 and 3 respectively, become larger as the distance from the observation position increases. The intensity at which the reflected light is received weakens as the angle formed between the reflection direction and the observation position direction increases. Furthermore, even if the light emission intensity at the light emission position is constant, because the intensity weakens in inverse proportion to the square of the distance, the light which reaches the reflection point weakens as the distance from the light emission position to the reflection position lengthens.

In a case where laser light is projected onto a floor surface, and an image is taken of the light reflected from the surface, as shown in FIG. 6, if the intensity of the light reflected from the reflection position 3 and received at the observation position is assumed to be '1', then the intensity of the reflected light received from the reflection position 1 is '10', ten times that of the reflection position 3. When imaging is performed of this range of light intensity using a single dynamic range, and quantization is performed in order to carry out digital processing, because the quantization number is fixed in standard digital processing, it becomes difficult to detect minute variations in brightness.

Figure 4:
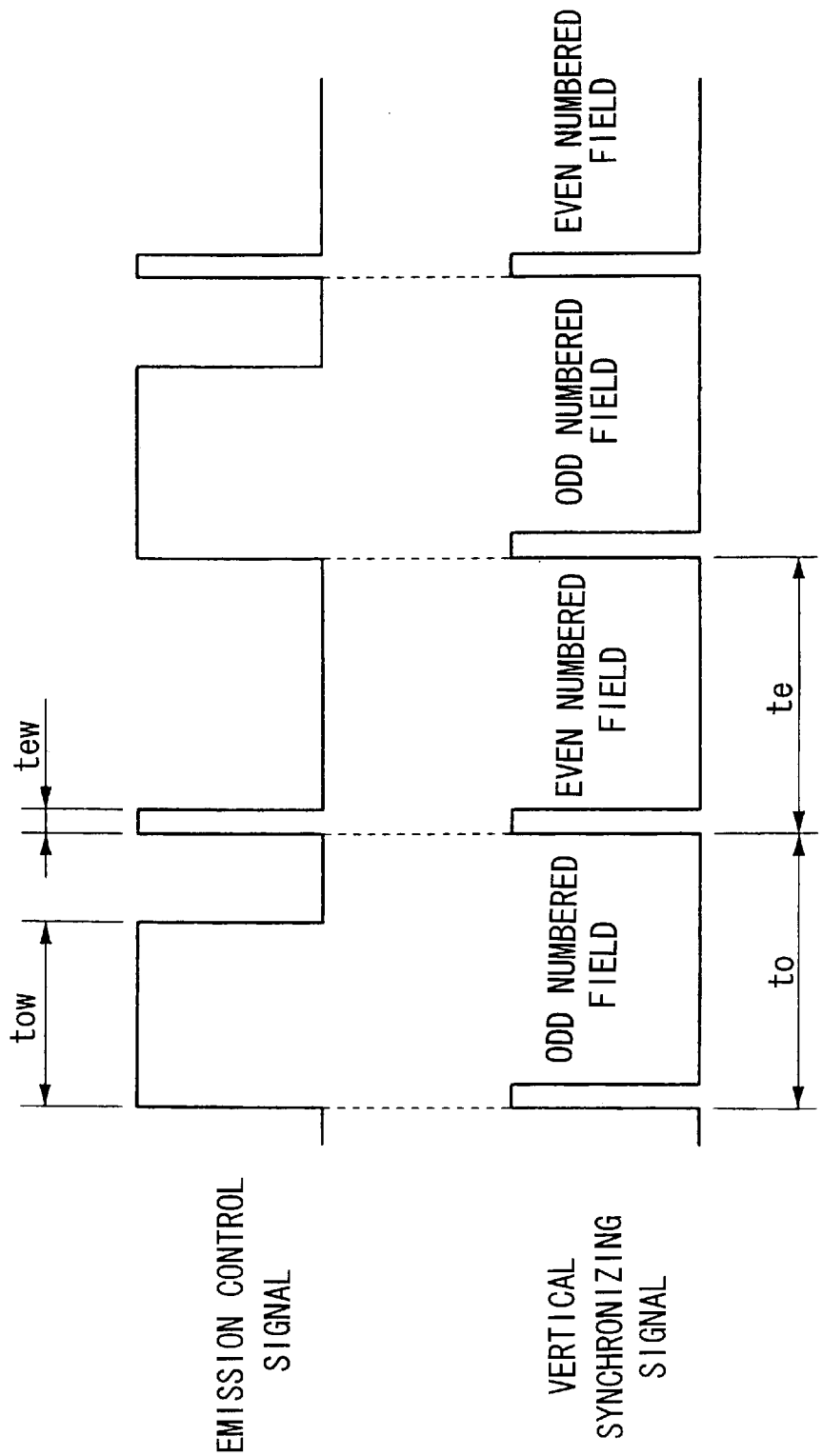
FIG. 4 is an explanatory diagram showing a signal output from an emission control section 14.

In order to avoid this type of phenomenon, the emission control section 14, using the PWM comprised therein, controls the emission time of the laser light emitted from the laser light source 11. Here, the emission control signal which is output to the laser light source 11 from the emission control section 14 will be described with reference to FIG. 4. FIG. 4 is an explanatory diagram showing the emission control signal which is output from the emission control section 14 in synchronization with the vertical synchronizing signal which is output to the short baseline length camera 12 and the long baseline length camera 13.

First, the vertical synchronizing signal will be described. The short baseline length camera 12 and the long baseline length camera 13 are interlaced scanning cameras wherein a single frame is formed from two fields, an odd numbered field and an even numbered field. The image for each field is obtained by scanning in synchronization with the vertical synchronizing signal. Furthermore, the scanning time "to" of the odd numbered field and the scanning time "te" of the even numbered field are the same.

On the other hand, the emission control signal is a pulse signal having a variable pulse width, which is output in synchronization with the vertical synchronizing signal. The laser emitting section 21 receives input of this emission control signal and emits laser light based on this emission control signal. The ON or OFF state of the laser light emitted from the laser emitting section 21 is controlled so that the laser light is emitted only when the emission control signal is at a high level. The PWM comprised within the emission control section 14 then outputs a pulse with a pulse width of "tow" in synchronization with the vertical synchronizing signal of the odd numbered field, and moreover outputs a pulse with a pulse width of "tew" in synchronization with the vertical synchronizing signal of the even numbered field.

Because the light quantity of the laser light emitted from the laser emitting section 21 is constant when the emission control signal is a high level, the intensity of the light received by the CCD of the imaging camera is closely proportional to the time period during the field scanning time for which light was emitted. In other words, even when strong light is projected onto a close object, if the length of time for which the light is projected is short, the effect will be the same as if weak light had been projected onto the object throughout the field scanning time. Consequently, the pulse width "tow" should be set at a pulse width whereby imaging is possible for reflected light from laser light projected onto a distant object. Furthermore, the pulse width "tew" should be set at a pulse width whereby satisfactory imaging is possible for reflected light from laser light projected onto a close object. The largest possible width for the pulse width "tow" is the scanning time "to" of the odd numbered field, and furthermore the pulse width "tew" must be a shorter time than the pulse width "tow".

Next, the process is described for measuring distance by taking an image of the reflected light of the laser light which was emitted based on the emission control signal shown in FIG. 4. First, in addition to outputting the emission control signal shown in FIG. 4 to the laser light source 11, the emission control section 14 also outputs the vertical synchronizing signal to the short baseline length camera 12 and the long baseline length camera 13. The laser emitting section 21 receives this signal and emits laser light, and the short baseline length camera 12 and the long baseline length camera 13 scan and output an image to the image memory in the image storing section 15 used for storing the odd numbered fields. The image storing section 15 then removes those pixels of very high brightness from the images, based on a predetermined threshold. Because the images obtained are odd numbered field images at a timing wherein strong laser light is projected, the pixels of high brightness represent close objects. Consequently, if pixels with high brightness are removed based on a predetermined threshold, it becomes possible to target the measurement of only distant objects.

Next, the short baseline length camera 12 and the long baseline length camera 13 scan the image again, and output to the image memory in the image storing section 15 used for storing even numbered fields. The image storing section 15 then removes those pixels of low brightness based on a predetermined threshold. Because the images thus obtained are even numbered field images at a timing wherein weak laser light is projected, the pixels with low brightness represent far-off objects. Consequently, if pixels with low brightness are removed based on a predetermined threshold, it becomes possible to target the measurement of only close objects.

Moreover, this same process is used in both the short baseline length camera 12 and the long baseline length camera 13.

Next, the image storing section 15 outputs the stored image to the height estimating section 16. Based on this image, the height estimating section 16 determines the distance to each pixel which shows the reflected light of the slit light using the principle of triangulation, and then executes the height estimation process. The height estimating section 16 then corrects the height estimated from the odd numbered field and the even numbered field respectively to compensate for momentum of the robot 1, and produces a height estimation result.

In this manner, the light emission intensity of the laser light is changed within the field scanning time, two field images each having a different light emission intensity are captured, and the pixels of a high brightness or a low brightness are removed based on a predetermined threshold, and consequently it becomes possible to take an image of the slit light at a uniform intensity of received light, regardless of the distance to the object. Consequently, it is possible to narrow down the dynamic range for imaging the slit light, and as a result it becomes possible to detect minute variations in brightness.

Furthermore, in the calibration phase of the optical system 2, the emission time of the laser light could also be controlled so that the slit light projected onto the floor surface is imaged by the short baseline length camera 12 and the long baseline length camera 13, and the pulse widths "tow", "tew" are then determined, based on the state of the image obtained, so that the brightness distribution of the slit light is uniform. In addition, the emission time may be changed according to the reflective properties of an obstacle or the distance to an obstacle.

Because the brightness distribution of the reflected light is made uniform in this manner, it is possible to avoid situations where the brightness falls outside the dynamic range of the camera, and so object recognition and distance measurement can be carried out accurately.

What is claimed is:

1. A distance measuring apparatus comprising:
    an image acquisition section for imaging reflected light which has been emitted from the apparatus, has passed through a slit, and has then been reflected off a surface of a target object to be measured;
    an emission control section for controlling an emission time of the light which is emitted and passes through the slit during a time an image is being scanned by the image acquisition section, and for changing an intensity of the received light in the image acquisition section; and
    a distance calculation section for calculating the distance to the object based on the image taken by the image acquisition section by referring to a positional relationship between a light emission position of the light passing through the slit and an image position.

2. The distance measuring apparatus according to claim 1, wherein the emission control section is constructed so as to determine the emission time according to the intensity of the reflected light received by the image acquisition section.

3. The distance measuring apparatus according to claim 1, wherein the image acquisition section removes pixels of a higher brightness than a predetermined first threshold value from the obtained images to generate images for a timing in which a relatively strong light is being projected, and removes pixels of a lower brightness than a predetermined second threshold value from the obtained images to generate images for a timing in which a relatively weak light is being projected.

4. A self-controlled robot incorporating the distance measuring apparatus according to claim 1.

5. The self-controlled robot according to claim 4, wherein the self-controlled robot is a bipedal robot.

6. The distance measuring apparatus according to claim 1, wherein the emission time is determined so that a brightness distribution of the reflected light is uniform based on the image taken by the image acquisition section.

7. The distance measuring apparatus according to claim 1, wherein the intensity of the received light is changed at a scanning period by changing the emission time in synchronization with a scanning period.

8. The distance measuring method comprising the steps of:
    emitting light which has passed through a slit onto a target object to be measured;
    imaging light reflected by the object by an imaging section;
    based on the obtained image, measuring a distance to the object by referring to a positional relationship between a light emission position of the light which has passed through the slit and an image position; and
    when the light passed through the slit is projected onto the object, varying an emission time of the light passed through the slit within a time period during which the imaging section scans the image.

9. The distance measuring method according to claim 8, wherein an intensity of the emitted light which passes through the slit and is projected onto the object is changed in accordance with the intensity of the imaged light reflected off the surface of the object.

10. The distance measuring method according to claim 8, wherein pixels of a higher brightness than a predetermined first threshold value are removed from the obtained images to generate images for a timing in which a relatively strong light is being projected;
    pixels of a lower brightness than a predetermined second threshold value are removed from the obtained images to generates images for a timing in which a relatively weak light is being projected; and
    the distance is measured based on the generated images.

11. The distance measuring method according to claim 8, wherein the emission time is determined so that a brightness distribution of the light reflected by the object is uniform based on the obtained image.

12. The distance measuring method according to claim 8, wherein the intensity of the light reflected by the object is changed at a scanning period by changing the emission time in synchronization with a scanning period.

* * * * *